July 16, 1968

E. S. GRIMMETT 3,392,539

FRACTIONAL CRYSTALLIZATION

Filed Aug. 23, 1965

INVENTOR
E. S. GRIMMETT

BY Young & Quigg

ATTORNEYS

# United States Patent Office 3,392,539
Patented July 16, 1968

3,392,539
FRACTIONAL CRYSTALLIZATION
Earl S. Grimmett, Idaho Falls, Idaho, assignor to Phillips Petroleum Company, a corporation of Delaware
Filed Aug. 23, 1965, Ser. No. 481,639
2 Claims. (Cl. 62—58)

ABSTRACT OF THE DISCLOSURE

A continuous fractional crystallization column is provided with a plurality of trays with downcomers traversing alternate trays, and heat exchangers positioned between trays. Compressed vapor is continuously passed to alternate heat exchangers to serve as a heating medium, the resulting condensed vapor is withdrawn and continuously passed to the remaining alternate heat exchangers to serve as a cooling medium.

Figure 1:
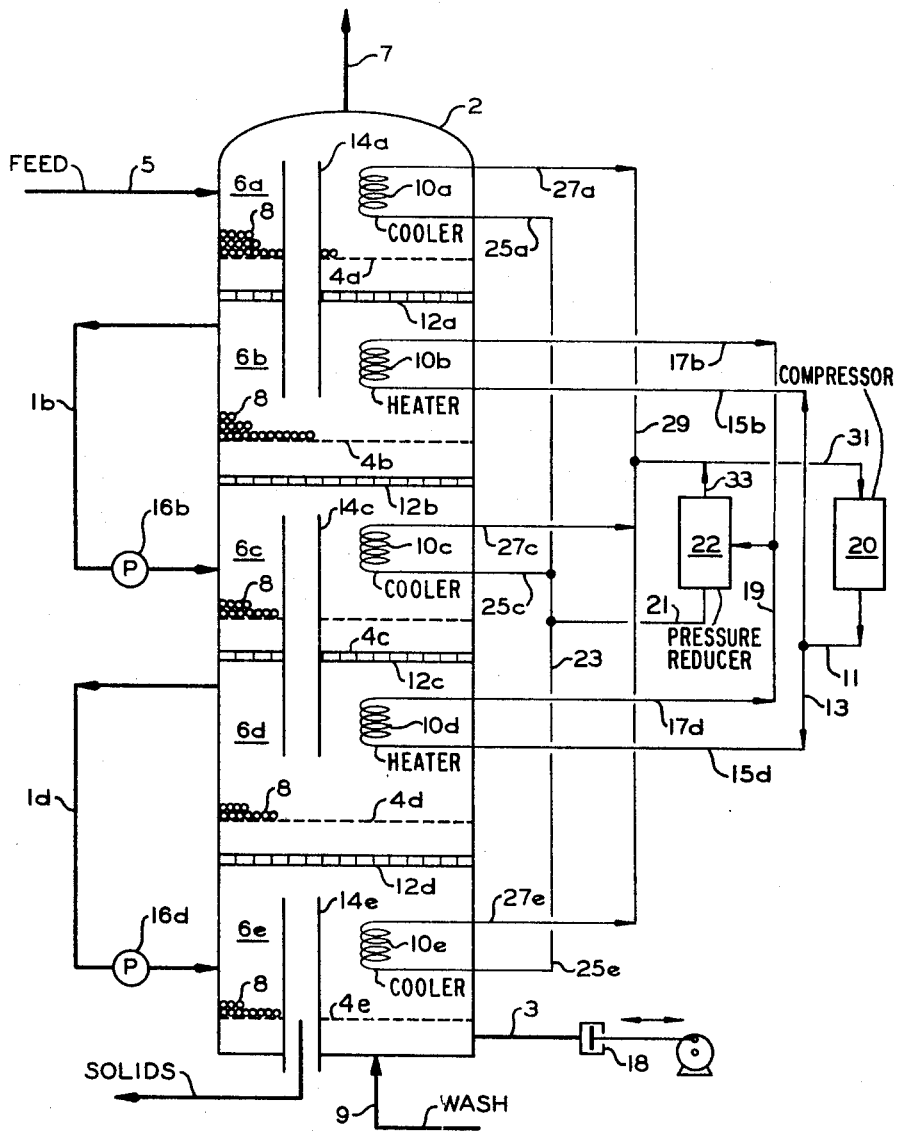

The invention described herein was made or conceived in the course of or under a contract with the U.S. Atomic Energy Commission.

This invention relates to separation of mixtures by crystallization.

Separation of mixtures by crystallization has been practiced for a number of years which comprises three basic steps, i.e., (1) crystallizing at least a portion but not all of the feed mixture, (2) separating the crystallized portion from the non-crystallized portion, and (3) purifying the crystallized portion. Recently, such separation has been accomplished by a multistage freezing and melting process conducted in the presence of wash liquid. Typical apparatus for effecting a multistage crystallization separation process comprises a vertical elongated column having a plurality of horizontally spaced apart perforated baffles disposed therein with downcomers traversing every other baffle and heat exchange coils disposed in the spaces between said baffles.

Illustrative objects of this invention are to provide in multistage crystallization separation processes and related apparatus:
(1) improved heat exchange;
(2) reduced turbulence;
(3) controlled temperature gradient; and
(4) improved thermal separation of adjacent hot and cold stages.

Other objects, aspects, and advantages of this invention will be apparent to those skilled in the art upon further study of this disclosure, the drawing, and appended claims.

Broadly, this invention utilizes a heat pump system for the complete heat exchange of a multistage crystallization separation-purification process. Furthermore, in combination with the heat exchange of a process employing alternating adjacent stages of heating and cooling, this invention utilizes a barrier system to prevent thermal exchange between the adjacent stages.

Figure 2:
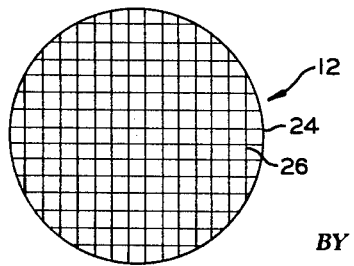

This invention will now be fully described with reference to the accompanying drawing, wherein FIGURE 1 diagrammatically illustrates a multistage fractional crystallization system employing this invention and FIGURE 2 represents a thermal barrier plate employed between the multistages of the system.

Referring now to the drawing and particularly to FIGURE 1, suitable apparatus is shown comprising column 2 having a plurality of perforated plates 4 represented as 4a through 4e positioned at vertically spaced intervals therein defining a plurality of separated spaces or contact stages 6 represented as 6a through 6e. Although five plates and stages have been shown in column 2, it is to be understood that more for less can be employed depending upon the number of stages needed or desired for the separation to be made. A layer of suitable material, such as stainless steel balls 8, each having a diameter greater than the openings in plates 4, is carried on each plate 4 as a support for solid material. A plurality of heat exchange coils 10 represented as 10a through 10e are positioned in stages 6. A plurality of thermal barrier plates 12, represented as 12a through 12d, are positioned in column 2 spaced below plates 4. Plates 12 can be of any form or material which prevents a thermal exchange but is permeable to liquids. A plurality of downcomers 14, represented as 14a, 14c and 14e, are positioned traversing plates 4a and 12a, 4c and 12c, and 4e, respectively, to provide for passage of solids from zones 6a to 6b, 6c to 6d, and 6e, respectively. A plurality of conduits 1, represented as 1b and 1d, and pumps 16, represented as 16b and 16d, provide for recycle of liquid from stages 6b to 6c and 6d to 6e, respectively. A pulse unit 18 communicates with stage 6e of column 2 below plate 4e via conduit 3. Feed inlet conduit 5 and liquid outlet conduit 7 communicate with stage 6a of column 2. Wash liquid inlet 9 communicates with stage 6e of column 2 under plate 4e. Downcomer 14e serves as the outlet for solids from column 2.

Heat exchange medium is supplied to coils 10 by a heat pump system comprising compressor 20 communicating with coils 10 through outlet conduit 11, manifold conduit 13, inlet conduits 15b and 15d of coils 10b and 10d, respectively, for passing hot compressed vapors; outlet conduits 17b and 17d connect with manifold conduit 19 which communicates with pressure-reducing means 22 for passing condensed vapors thereto; liquid under reduced pressure passes to coils 10a, 10c and 10e via conduits 21, manifold conduit 23 and inlet conduits 25a, 25c and 25e; low pressure vapors pass through outlet conduits 27a, 27c and 27e, manifold conduit 29, and inlet conduit 31 to compressor 20; and vapor from pressure-reducing means 22 passes through conduit 33 to conduit 31. Although a compressor vapor-liquid heat pump system has been shown and described, it is to be understood that other heat pump systems can be employed such as a total liquid cycle.

In FIGURE 2, a detail of a suitable thermal barrier plate 12 is shown comprising frame 24 holding mesh network 26.

The operation of this invention is further illustrated in the following example:

A liquid mixture having a density of 1.4 g./cm.$^3$, comprising about 95 weight percent Al(NO)$_3 \cdot$9H$_2$O, about 5 weight percent of 60 weight percent HNO$_3$, and minor quantities of sodium nitrate, mercuric nitrate and nuclear fission products, is fed at a temperature of about 90° C. and at 15 g./min. through conduit 5 to column 2 which has a 3-inch I.D. A wash liquid comprising 60 weight percent HNO$_3$ is fed at a temperature of about 0° C. and about 1.5 g./min. through conduit 9 to column 2. Vaporous fluorocarbon, CH$_2$F$_2$, at a temperature of about 60° C. and a pressure of about 220 p.s.i.a., passes from compressor 20 to heating coils 10b and 10d wherein it condenses and the condensate at a temperature of about 60° C. passes to expansion chamber 22 wherein the temperature lowers to about 10° C. and the pressure drops to about 61 p.s.i.a. The condensed CH$_2$F$_2$ passes from chamber 22 to cooling coils 10a, 10c and 10e wherein it vaporizes and has a temperature of 10° C. The vapor from the cooling coil returns to compressor 20 for recycle through the system. The aluminum nitrate in the feed mixture crystallizes out of solution in stage 6a and builds up a bed of crystals on beads 8 until they overflow through downcomer 14a into stage 6b wherein they are melted. Wash HNO$_3$, flowing countercurrent to the feed material, washes the impurities from the crystals and removes same from column 2 through conduit 7. A solution of crystal melt passes from stage 6b to stage 6c through recycle conduit 1b and pump 16b. The wash HNO₃ passes through plate 4a into stage 6a. In stage 6c the $Al(NO_3)_3$ is recrystallized, is washed with $HNO_3$ and passed to zone 6d through downcomer 14c as the wash liquid is passed to stage 6b through plate 4b. In stage 6d, the crystals are melted and a pregnant solution thereof passed to stage 6e through recycle conduit 1d and pump 16d. In stage 6e the $Al(NO_3)_3$ is again recrystallized, washed with $HNO_3$ and removed from column 2 through downcomer 14e for further processing and recovery, not shown. A pulsation of about 300 c.p.m. (cycles per minute) is imparted to the wash $HNO_3$ as it passes through the column by pulse unit 18. The pulsations enhance the crystal flow, heat transfer, and washing action of the $HNO_3$ in the various stages.

The following composition material balance around column 2 shows the effectiveness of the above example for purifying $Al(NO_3)_3$.

| Stream | Density, g./cc. | Moles | | | | Fission Products, g./l. | V, g.l. |
|---|---|---|---|---|---|---|---|
| | | $Al(NO_3)_3 \cdot NHO_3$ | | $NaNO_3Hg(NO_3)_2$ | | | |
| 5 | 1.60 | 3.5 | 0.1 | 0.0208 | 0.0152 | 1.08 | 1×10⁻³ |
| 9 | 1.373 | 0 | 13.1 | 0 | 0 | 0 | 0 |
| 7 | 1.43 | 0.027 | 13.2 | 0.0208 | 0.152 | 10.8 | 1×10⁻² |
| Product | | (¹) | 0 | 0 | 0 | 0 | 0 |

¹ Crystalline.

The instant invention is broadly applicable to the separation and purification by crystallization of multi-component mixtures, such as eutectic systems and solid-solution systems to obtain a single, relatively pure component. The mixtures can be organic or inorganic, or combinations of both types of components. For example, it can be employed in the separation of naphthalene from benzene-naphthalene mixtures, the separation of naphthalene from a naphthalene-beta-naphthol solid-solution system, the separation of fission products as impurities from atomic reactor wastes, the separation of water (as ice) from food products such as fruit and vegetable juices, milk, wine, beer, coffee, tea and various alcoholic liquors, the purification of amorphous materials such as fats and oils, and the like. Those skilled in the art will recognize the wide applicability of this invention to multi-component mixtures.

The wash fluids that can be employed in this invention also can widely vary. In some cases the wash fluids can be used to dissolve one or more of the components in the mixture or can be used to simply flush out one or more insoluble components. Where the crystallizable component of interest is normally soluble in the wash fluid, lower operation temperatures can be used to decrease such solubility. Generally, the density of the wash fluid will be different from that of the feed, crystallizable material, and crystals, so that the wash fluid will flow countercurrent. Where the density of the wash fluid is less, the feed will be introduced into the top of the multi-stage crystallizer and it will fall, as will the melted and recrystallized material, downward through the body of upward-flowing wash fluid. Where the density of the wash fluid is heavier, it will flow downwardly countercurrent to the upward-flowing feed, etc. The feed can be introduced into the body of wash fluid as a melt or liquid or in the form of a solid; where the feed is introduced in the latter form, instead of employing a chilling coil in the feed inlet end of the column, a heating coil can be used to initially melt the solid. In some cases, it may be desirable to introduce the wash liquid as a solution saturated or supersaturated with the crystallizable material of interest, for example, in order to aid the formation of crystallizing nuclei. Further, the wash liquid can be introduced at a plurality of levels and/or different temperatures in the crystallizer column. In some cases it will be desirable to use two or more different wash liquids, each selective for a different component. For example, a wash liquid selective for removing one impurity can be used, and another wash liquid used for removal of a second impurity. The multiple wash liquids can mix in the upper section of the column and then be removed and separated.

Although I prefer to introduce the feed and wash liquid continuously into the crystallizer column, either or both can be fed intermittently. Distributor rings or the like can be used in introducing the feed and/or wash liquid, where desired. Agitation can be used to distribute the feed and/or to promote crystal growth, as, for example, by placing a motor-driven agitator in the upper chilling section of the column. Usually the top tray in the crystallizer will have a larger holdup than the lower trays. Although I prefer to use internal heat exchange coils on each tray, and use each one alternatively for melting and chilling, I can use external heat exchange means, such as jackets, for these purposes. Instead of heat exchange coils, heat exchange ribbon (flattened tubes) or even tube bundles can be used on each tray. The number of trays used, their size, shape, etc., can vary, of course, and will be dependent on the nature of the feed, purity desired, etc. Insulation material can be used to maintain proper operating temperatures. The materials used in constructing the crystallizer column will depend on the nature of the feed and wash liquid, the capacity of the column, etc. Pyrex glass spaces can be used between trays to permit visual observation of the tray performance, and where acidic wash liquids are used Pyrex glass, polymeric fluorocarbon plastics, and austenitic stainless steel (e.g., 304, 347, 316) can be used in constructing the column.

Although not essential, the crystallizer column of this invention can be provided with suitable means to subject the body of liquid and crystals within the column to pulsations and intermittently displace or reverse the normal flow thereof. This can be accomplished by connecting, for example, the lower chilling section to a lateral pipe in which a reciprocating piston is disposed and actuated by means of a motor, rod, and eccentric. The pulsations generated by this system, for example, can alternately displace upwardly the wash liquid and/or melt accumulated on the bottom tray countercurrent to the movement of crystals and pull wash liquid and/or melt downwardly past and through crystals on the tray above. The particular crystals, shape of the pulses, and the relative speed of the downward and upward (or negative and positive) strokes or pulses will determine the relative movement of these materials. Such pulsations can be used to increase the efficiency of the separation.

As described with reference to the drawing, each heating stage and each freezing stage is operated at the same temperature. However, if desired, the pressure of the heat exchange medium introduced to each freezing stage can be controlled separately, such as by using several expansion chambers in place of chamber 22, shown, so that each stage operates at a different pressure and, accordingly, a different temperature. The expansion chambers could be operated in series or in parallel, depending on the particular circumstances and temperature variations desired. Also, different temperatures can be employed in the various heating stages. The pressure of the vapor to each stage can be varied by use of a multistage compressor and withdrawing vapor from various stages.

The degree of pulsation which may be imparted to the process of this invention will vary and be directed by the particular separation being performed. However, generally, pulse frequencies will range from 10 to 800 per minute and pulse heights in the column will range up to about one-fourth inch.

To one skilled in the art, reasonable variations and modifications of this invention will be apparent which will not depart from the spirit and scope thereof.

That which is claimed is:

1. In apparatus for separation and purification of a crystallizable component from a multicomponent mixture comprising:

a vertical elongated column;
a plurality of perforated plates horizontally disposed and spaced apart throughout said column;
downcomers traversing every other perforated plate;
heat exchange coils disposed in the spaces between said perforated plates;
pulse means communicating with said column;
means for introducing liquid mixture and liquid wash communicating with the first and second end portions of said column respectively;
means for withdrawing liquid material communicating with said first end portion of said column; and
means for withdrawing solids communicating with said second end portion of said column;
the improvement comprising;
means for introducing compressed vapor to every other of said coils;
means for withdrawing condensed vapor from said every other of said coils and introducing same to the other coils;
means for withdrawing vapor from said other coils communicating with said means for introducing compressed vapors; and
means for compressing vapor associated with said last withdrawing means.

2. Apparaus for separation and purification of a crystallizable component from a multicomponent mixture comprising:

a vertical elongated column;
a plurality of perforated plates horizontally disposed and spaced apart throughout said column;
a plurality of thermal barrier means, each being horizontally disposed below a respective one of said perforated plates;
downcomers traversing every other perforated plate;
pulse means communicating with the lower portion of said column;
means for introducing liquid mixture and liquid wash communicating with the upper and lower portions of said column, respectively;
means for withdrawing liquid material communicating with the upper portion of said column; and
means for withdrawing solids communicating with the lower portion of said column.

References Cited
UNITED STATES PATENTS

| | | | |
|---|---|---|---|
| 2,731,456 | 1/1956 | Weedman | 62—58 |
| 3,132,096 | 5/1964 | Walton | 62—58 |
| 3,305,320 | 2/1967 | Weech | 62—58 |

NORMAN YUDKOFF, *Primary Examiner.*

E. P. HINES, *Assistant Examiner.*